US012649856B2

(12) United States Patent
Defoer

(10) Patent No.: US 12,649,856 B2
(45) Date of Patent: *Jun. 9, 2026

(54) FLAME RETARDANT COMPOSITION

(71) Applicant: BOREALIS AG, Vienna (AT)

(72) Inventor: Johan Defoer, Mechelen (BE)

(73) Assignee: Borealis AG, Vienna (AT)

( * ) Notice: Subject to any disclaimer, the term of this patent is extended or adjusted under 35 U.S.C. 154(b) by 722 days.

This patent is subject to a terminal disclaimer.

(21) Appl. No.: 17/251,851

(22) PCT Filed: Jun. 14, 2019

(86) PCT No.: PCT/EP2019/065763
§ 371 (c)(1),
(2) Date: Dec. 14, 2020

(87) PCT Pub. No.: WO2019/238957
PCT Pub. Date: Dec. 19, 2019

(65) Prior Publication Data
US 2021/0253873 A1 Aug. 19, 2021

(30) Foreign Application Priority Data

Jun. 15, 2018 (EP) ..................................... 18178135

(51) Int. Cl.
| | |
|---|---|
| *C08K 3/32* | (2006.01) |
| *A43B 1/00* | (2006.01) |
| *C08L 23/0892* | (2025.01) |
| *C09D 5/18* | (2006.01) |
| *C09D 123/08* | (2006.01) |
| *C09K 21/04* | (2006.01) |
| *C09K 21/14* | (2006.01) |
| *D06N 3/00* | (2006.01) |
| *D06N 3/04* | (2006.01) |
| *C08K 3/016* | (2018.01) |
| *C08L 23/0869* | (2025.01) |

(52) U.S. Cl.
CPC .................. *C09D 5/18* (2013.01); *A43B 1/00* (2013.01); *C08K 3/32* (2013.01); *C08L 23/0892* (2013.01); *C09D 123/0815* (2013.01); *C09K 21/04* (2013.01); *C09K 21/14* (2013.01); *D06N 3/0009* (2013.01); *D06N 3/0059* (2013.01); *D06N 3/045* (2013.01); *C08K 3/016* (2018.01); *C08K 2003/323* (2013.01); *C08L 23/0869* (2013.01); *C08L 2201/02* (2013.01); *C08L 2205/035* (2013.01); *D06M 2200/30* (2013.01); *D06N 2209/067* (2013.01); *D06N 2211/103* (2013.01); *D06N 2211/106* (2013.01)

(58) Field of Classification Search
None
See application file for complete search history.

(56) References Cited

U.S. PATENT DOCUMENTS

| | | | | |
|---|---|---|---|---|
| 5,213,783 A | * | 5/1993 | Fukumura | ................ C08K 3/32 |
| | | | | 423/315 |
| 5,504,172 A | | 4/1996 | Imuta et al. | |
| 6,437,035 B1 | | 8/2002 | Young | |
| 6,444,315 B1 | | 9/2002 | Barfurth et al. | |
| 2009/0301751 A1 | * | 12/2009 | Iwasaki | ..................... C08F 8/00 |
| | | | | 524/401 |
| 2016/0017230 A1 | | 1/2016 | Marrwitz et al. | |
| 2021/0163723 A1 | * | 6/2021 | Kulshreshtha | .......... B32B 27/36 |

FOREIGN PATENT DOCUMENTS

| | | | |
|---|---|---|---|
| CN | 102329549 A | | 1/2012 |
| CN | 104194161 A | | 12/2014 |
| CN | 106634361 A | | 5/2017 |
| CN | 106832416 A | | 6/2017 |
| CN | 108129787 | * | 6/2018 |
| CN | 108129787 A | | 6/2018 |
| CN | 105860239 | | 6/2020 |
| FR | 2525615 | | 10/1991 |
| GB | 2386901 A | | 10/2003 |
| JP | H08109286 | | 4/1996 |
| JP | 2002234964 | | 8/2002 |
| JP | 2007246730 | * | 9/2007 |
| JP | 2007246730 A | | 9/2007 |
| JP | 2015140500 A | | 8/2015 |
| JP | 2016089144 A | | 5/2016 |
| KR | 20110138011 A | | 12/2011 |
| KR | 101165565 B1 | | 7/2012 |
| WO | 200001745 A1 | | 1/2000 |
| WO | 2002026879 A1 | | 4/2002 |
| WO | 2005000958 A1 | | 1/2005 |
| WO | 2005111282 A1 | | 11/2005 |
| WO | 2011114575 A1 | | 9/2011 |
| WO | 2013159942 A2 | | 10/2013 |
| WO | 2015188358 A1 | | 12/2015 |
| WO | WO2016/041922 | * | 3/2016 |

(Continued)

OTHER PUBLICATIONS

Coloring Polymers for Today's Medical Devices; Medical Design Briefs Oct. 1, 2012 pp. 1-9. (Year: 2012).*
International Search Report and Written Opinion, relating to Application No. PCT/EP2019/065763, dated Oct. 18, 2019. 14 pages.
Encyclopedia of Polymer Science and Engineering, vol. 6 (1986), pp. 383-410.
Encyclopedia of Materials: Science and Technology, 2001 Elsevier Science Ltd.: Polyethylene: High-pressure, R. Klimesch, D.Littmann and F.-O. Mähling pp. 7181-7184.
Shilpa et al. "Polyaspartic acid based superabsorbent polymers", European Polymer Journal, vol. 59, p. 363-376 (2014).

(Continued)

*Primary Examiner* — David J Buttner
(74) *Attorney, Agent, or Firm* — Meunier Carlin & Curfman LLC

(57) ABSTRACT

The invention provides aflame retardant composition comprising and ammonium polyphosphate a silane functionalised ethylene copolymer.

17 Claims, 1 Drawing Sheet

(56)  References Cited

FOREIGN PATENT DOCUMENTS

WO    WO2016/041940    *  3/2016
WO    2016096353  A1    6/2016
WO    2016130602  A1    8/2016
WO    2017/076628  A1    5/2017
WO    2017076629  A1    5/2017
WO    2018/049117  A1    3/2018

OTHER PUBLICATIONS

Jun, "Phosphorus Fine Chemicals Production Technique", Yunnan Science and Technology Press, First Edition, pp. 185-186, Dec. 1998.
Bao et al., "Research and Application Intumescent Flame Retardant", Harbin Institute of Technology Press, First Edition, pp. 193-195, Feb. 2005.
"Modification Principle and Technology of Polymer", edited by Yu Shouwu et al., pp. 172-173, Intellectual Property Publishing House, May 2015, first edition.
"Research progress on modification and application of ammonium polyphosphate", Jin Dong et al., "Fine and Specialty Chemicals", vol. 24, No. 11, pp. 47-50, Nov. 2016.
"Research Progress in Surface Modification of Ammonium Polyphosphate", Qu Hongqiang et al., "China Plastics", vol. 26, No. 12, pp. 93-97, Dec. 2012.

* cited by examiner

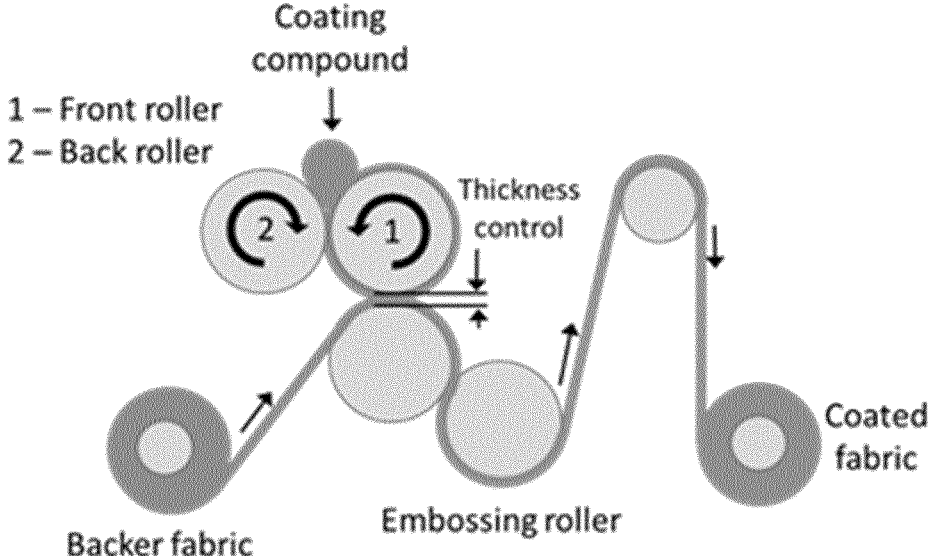

FLAME RETARDANT COMPOSITION

CROSS-REFERENCE TO RELATED APPLICATIONS

This application is a United States National Phase Patent Application of International Patent Application Number PCT/EP2019/065763, filed on Jun. 14, 2019, which claims the benefit of priority to application Ser. No. 18/178,135.2, filed Jun. 15, 2018, which is incorporated by reference herein in its entirety.

The present invention relates to a flame retardant composition, in particular a composition comprising a blend of an ammonium polyphosphate and a silane functionalised ethylene copolymer. The present invention also relates to substrates and articles coated with said flame retardant composition and to the use of said composition as a flame retardant.

BACKGROUND

Polymer coated textile materials are used in a wide range of applications such as carpets, mattresses, pillows and seat upholstery for office furniture, car interiors etc. Such materials desirably have a good degree of softness as well as attractive abrasion and UV resistance properties. It is also important that the materials comply with safety legislation concerning flame retardancy. One solution to obtain the desired flame retardancy is to apply a flame retardant to the material.

A "flame retardant" is a substance which is activated by the presence of an ignition source and which prevents or slows the further development of ignition by a variety of different physical and chemical methods.

Global demand for flame retardants has exceeded 2 million tons per year. As it is often not possible to select a polymer coating material that is inherently flame retardant, adding a flame retardant to the polymer is needed. The flame retardant can be mixed with the base material or chemically bonded to it.

Broadly speaking, flame retardants can be divided into two groups: (a) inorganic or mineral flame retardants and (b) halogenated compounds. While the performance of halogenated flame retardants is excellent, many of these chemicals are associated with health and environmental problems. As a result, the use of several brominated and chlorinated flame retardants is now prohibited. There thus remains a need to provide new and improved flame retardants which are preferably halogen free.

Ammonium polyphosphate flame retardants are one possible alternative, however some suffer from poor processability during mixing with a polymer base material. Typically, such mixing is carried out by compounding the various components using extrusion. Some ammonium polyphosphates have been found to lead to "plate out" during this process, i.e. leaving a coating on the metal rollers in the extruder. These unwanted deposits are obviously detrimental to the process in terms of both the time and cost associated with their removal from the equipment. Alternative ammonium polyphosphate based flame retardants which do not suffer from these problems, but which retain excellent flame retardant properties are thus needed.

The present inventors have surprisingly found that a flame retardant composition comprising a mixture of an ammonium polyphosphate with a silane functionalised ethylene copolymer offers an attractive solution to this problem.

Ideally, the compositions have flame retardancy which at least meets Industry standards.

SUMMARY OF INVENTION

Viewed from one aspect the invention provides a flame retardant composition comprising:
  a) an ammonium polyphosphate; and
  b) a silane functionalised ethylene copolymer.

Viewed from another aspect, the invention provides the use of a flame retardant composition as herein defined as a flame retardant.

Viewed from a further aspect, the invention provides a process for coating a substrate with a flame retardant composition as herein defined, said process comprising applying said composition to the surface of said substrate.

Viewed from another aspect, the invention provides a substrate, preferably a fabric substrate, coated with a flame retardant composition as herein defined.

Viewed from a further aspect, the invention provides an article comprising at least one component formed from a coated substrate as hereinbefore defined.

BRIEF DESCRIPTION OF THE DRAWINGS

FIG. 1: Calendaring coating roller equipment

DETAILED DESCRIPTION OF INVENTION

Composition

The flame retardant compositions of the invention comprise a mixture of an ammonium polyphosphate and a silane functionalised ethylene copolymer.

Ideally, the flame retardant is halogen-free.

The weight ratio of the ammonium polyphosphate to the silane functionalised ethylene copolymer may be in the range 9:1 to 1:9, preferably 5:1 to 1:5, even more preferably 3:1 to 1:3, such as 1:1.

The ammonium polyphosphate may be any inorganic salt of polyphosphoric acid and ammonia. Ammonium polyphosphates are typically represented by the formula $[NH_4PO_3]_n$. The chain length (n) of this polymeric compound is both variable and branched, and can be greater than 1000. Short and linear chain APPs (n <100) are more water sensitive (hydrolysis) and less thermally stable than longer chain APPs (n>1000), which show a very low water solubility (<0.1 g/100 ml).

Ammonium polyphosphates are stable, non-volatile compounds.

Ammonium polyphosphates for use in the flame retardants of the invention are commercially available and can be bought from many suppliers. Examples include the ADK STAB FP-2000 series of flame retardants available from Adeka Polymer Additive Europe or IC FR5110 available from Into Chemicals.

The silane functionalised ethylene copolymer is an ethylene copolymer (a) comprising silane group(s) containing units. The silane group(s) containing units can be present as a comonomer of the ethylene copolymer or as a compound grafted chemically to the polymer.

Accordingly, in cases where the silane group(s) containing units are incorporated to the polymer (a) as a comonomer, the silane group(s) containing units are copolymerized as comonomer with ethylene monomer during the polymerization process of polymer (a). In case the silane group(s) containing units are incorporated to the polymer by grafting, the silane group(s) containing units are reacted chemically (also called as grafting), with the polymer (a) after the polymerization of the polymer (a). The chemical reaction, i.e. grafting, is performed typically using a radical forming agent such as peroxide. Such chemical reaction may take place before or during the lamination process of the invention. In general, copolymerization and grafting of the silane group(s) containing units to ethylene are well known techniques and well documented in the polymer field and within the skills of a skilled person. Example technologies include the Sioplas and Monosil processes.

In one embodiment, the silane functionalised ethylene copolymer is preferably a polymer of ethylene (a) which is selected from:

(a1) a copolymer of ethylene and a silane group(s) containing comonomer;

(a2) a copolymer of ethylene with one or more polar comonomer(s) selected from (C1-C6)-alkyl acrylate or (C1-C6)-alkyl (C1-C6)-alkylacrylate comonomer(s), which copolymer (a2) bears silane group(s) containing units and which copolymer (a2) is different from the polymer of ethylene (a1); or (a3) a copolymer of ethylene with one or more (C3-C10)-alpha-olefin comonomers which is different from polymer of ethylene (a1) and polymer of ethylene (a2) and to which silane group(s) containing units have been grafted.

It is well known that the use of peroxide in the grafting embodiment decreases the melt flow rate (MFR) of an ethylene polymer due to a simultaneous crosslinking reaction. As a result, the grafting embodiment can bring limitations to the choice of the MFR of polymer (a) as a starting polymer, which choice of MFR can have an adverse impact on the quality of the polymer at the end use application. Furthermore, the by-products formed from peroxide during the grafting process can have an adverse impact on use life of the polymer composition at end use application.

The copolymerization of the silane group(s) containing comonomer into the polymer backbone provides more uniform incorporation of the units compared to grafting of the units. Moreover, compared to grafting, the copolymerization does not require the addition of peroxide after the polymer is produced.

Accordingly, the silane group(s) containing units are preferably present in polymer (a) as a comonomer, i.e. incorporated to the polymer (a1) as a comonomer with the ethylene monomer, and in case of the polymer (a2), as a comonomer together with the polar comonomer and ethylene monomer. Polymer (a2) thus contains two different comonomers, the silane group(s) containing comonomer and the polar comonomer, as hereinbefore defined, i.e. the polymer (a2) is a terpolymer. It will be understood, however, that in polymer (a2), the silane group(s) containing units may also be present as units which have been grafted to a copolymer of ethylene and the one or more polar comonomer(s).

"Silane group(s) containing comonomer" means herein above, below or in claims that the silane group(s) containing units are present as a comonomer.

The silane group(s) containing unit or, preferably, the silane group(s) containing comonomer, of polymer of ethylene (a), is preferably a hydrolysable unsaturated silane compound represented by the formula (I):

$$R^1SiR^2_qY_{3-q} \tag{I}$$

wherein $R^1$ is an ethylenically unsaturated hydrocarbyl, hydrocarbyloxy or (meth)acryloxy hydrocarbyl group, each $R^2$ is independently an aliphatic saturated hydrocarbyl group, Y which may be the same or different, is a hydrolysable organic group and q is 0, 1 or 2; Further suitable silane group(s) containing comonomer is e.g. gamma-(meth)acryl-oxypropyl trimethoxysilane, gamma(meth)acryloxypropyl triethoxysilane, and vinyl triacetoxysilane, or combinations of two or more thereof.

One suitable subgroup of compound of formula (I) is an unsaturated silane compound or, preferably, comonomer of formula (II)

$$CH_2=CHSi(OA)_3 \tag{II}$$

wherein each A is independently a hydrocarbyl group having 1-8 carbon atoms, suitably 1-4 carbon atoms.

The silane group(s) containing unit, or preferably, the comonomer, of the invention, is preferably the compound of formula (II) which is vinyl trimethoxysilane, vinyl bismethoxyethoxysilane, vinyl triethoxysilane, more preferably vinyl trimethoxysilane or vinyl triethoxysilane, more preferably vinyl trimethoxysilane.

The amount (mol %) of the silane group(s) containing units present, preferably present as comonomer, in the polymer (a) is preferably of 0.01 to 2.0 mol %, preferably 0.01 to 1.00 mol %, suitably from 0.05 to 0.80 mol %, suitably from 0.10 to 0.60 mol %, suitably from 0.10 to 0.50 mol %, when determined according to "Comonomer contents" as described below under "Determination Methods".

In one embodiment (A1), the polymer (a) is a polymer of ethylene which bears silane group(s) containing comonomer (a1). In this embodiment A1, the polymer (a1) does not contain, i.e. is without, a polar comonomer as defined for polymer (a2). Preferably the silane group(s) containing comonomer is the sole comonomer present in the polymer (a1). Accordingly, the polymer (a1) is preferably produced by copolymerizing ethylene monomer in a high pressure polymerization process in the presence of silane group(s) containing comonomer using a radical initiator.

Preferably the silane group(s) containing comonomer is the only comonomer present in the polymer of ethylene (a1).

In said one preferable embodiment (A1), the polymer (a1) is preferably a copolymer of ethylene with silane group(s) containing comonomer according to formula (I), more preferably with silane group(s) containing comonomer according to formula (II), more preferably with silane group(s) containing comonomer according to formula (II) selected from vinyl trimethoxysilane, vinyl bismethoxyethoxysilane, vinyl triethoxysilane or vinyl trimethoxysilane comonomer, as defined above or in claims. Most preferably the polymer (a1) is a copolymer of ethylene with vinyl trimethoxysilane, vinyl bismethoxyethoxysilane, vinyl triethoxysilane or vinyl trimethoxysilane comonomer, preferably with vinyl trimethoxysilane or vinyl triethoxysilane comonomer, most preferably vinyl trimethoxysilane comonomer.

In another embodiment (A2), the polymer (a) is a polymer of ethylene with one or more polar comonomer(s) selected from (C1-C6)-alkyl acrylate or (C1-C6)-alkyl (C1-C6)-alkylacrylate comonomer(s) (a2), which copolymer (a2) bears silane group(s) containing units. In this embodiment (A2) the polymer (a2) is a copolymer of ethylene with one or more, preferably one, polar comonomer(s) selected from (C1-C6)-alkyl acrylate or (C1-C6)-alkyl (C1-C6)-alkylacrylate comonomer(s) and silane group(s) containing comonomer. Preferably, the polar comonomer of the polymer of ethylene (a2) is selected from one of (C1-C6)-alkyl acrylate comonomer, preferably from methyl acrylate, ethyl acrylate or butyl acrylate comonomer. More preferably, the polymer (a2) is a copolymer of ethylene with a polar comonomer selected from methyl acrylate, ethyl acrylate or butyl acrylate comonomer and with silane group(s) containing comonomer. The polymer (a2) is most preferably a copolymer of ethylene with a polar comonomer selected from methyl acrylate, ethyl acrylate or butyl acrylate comonomer and with silane group(s) containing comonomer of compound of formula (I). Preferably, in this embodiment the polar comonomer and the preferable silane group(s) containing comonomer are the only comonomers present in the copolymer of ethylene (a2).

The content of the polar comonomer present in the polymer (a2) is preferably of 0.5 to 30.0 mol %, 2.5 to 20.0 mol %, preferably of 4.5 to 18 mol %, preferably of 5.0 to 18.0 mol %, preferably of 6.0 to 18.0 mol %, preferably of 6.0 to 16.5 mol %, more preferably of 6.8 to 15.0 mol %, more preferably of 7.0 to 13.5 mol %, when measured according to "Comonomer contents" as described below under the "Determination methods".

In said another preferable embodiment (A2), the polymer (a2) is preferably a copolymer of ethylene with the polar comonomer, as defined above, below or in claims, and with silane group(s) containing comonomer according to formula (I), more preferably with silane group(s) containing comonomer according to formula (II), more preferably with silane group(s) containing comonomer according to formula (II) selected from vinyl trimethoxysilane, vinyl bismethoxyethoxysilane, vinyl triethoxysilane or vinyl trimethoxysilane comonomer, as defined above or in claims. Preferably the polymer (a2) is a copolymer of ethylene with methyl acrylate, ethyl acrylate or butyl acrylate comonomer and with vinyl trimethoxysilane, vinyl bismethoxyethoxysilane, vinyl triethoxysilane or vinyl trimethoxysilane comonomer, preferably with vinyl trimethoxysilane or vinyl triethoxysilane comonomer. More preferably the polymer (a2) is a copolymer of ethylene with methyl acrylate comonomer and with vinyl trimethoxysilane, vinyl bismethoxyethoxysilane, vinyl triethoxysilane or vinyl trimethoxysilane comonomer, preferably with vinyl trimethoxysilane or vinyl triethoxysilane comonomer.

Accordingly, the polymer (a2) is most preferably a copolymer of ethylene with methyl acrylate comonomer together with silane group(s) containing comonomer as defined above, more preferably a copolymer of ethylene with methyl acrylate comonomer and with vinyl trimethoxysilane or vinyl triethoxysilane comonomer, preferably with methyl acrylate comonomer and with vinyl trimethoxysilane comonomer.

Without binding to any theory, methyl acrylate (MA) is the only acrylate which cannot go through the ester pyrolysis reaction, since does not have this reaction path. Therefore, the polymer (a2) with MA comonomer does not form any harmful free acid (acrylic acid) degradation products at high temperatures, whereby polymer (a2) of ethylene and methyl acrylate comonomer contribute to good quality and life cycle of the end article thereof. This is not the case e.g. with vinyl acetate units of EVA, since EVA forms at high temperatures harmful acetic acid degradation products. Moreover, the other acrylates like ethyl acrylate (EA) or butyl acrylate (BA) can go through the ester pyrolysis reaction, and if degrade, could form volatile olefinic by-products.

In another embodiment (A3), the polymer (a) is the polymer (a3) which is a copolymer of ethylene with one or more (C3-C10)-alpha-olefin comonomer which is different from polymer of ethylene (a1) and polymer of ethylene (a2) and to which silane group(s) containing units have been grafted. Preferably, polymer (a3) is a polymer of ethylene with one or more, preferably one, comonomer(s) selected from (C3-C8)-alpha-olefin comonomer. In such embodiments, the polymer (a3) may be further defined by any of the embodiments described above for the ethylene based plastomer.

Most preferably the polymer (a) is selected from polymer (a1) or (a2).

The melt flow rate, $MFR_2$, of polymer (a), is preferably less than 20 g/10 min, preferably less than 15 g/10 min, preferably from 0.1 to 13 g/10 min, preferably from 0.2 to 10 g/10 min, preferably from 0.3 to 8 g/10 min, more preferably from 0.4 to 6, g/10 min (according to ISO 1133 at 190° C. and at a load of 2.16 kg).

The polymer (a), preferably has a melting temperature of 120° C. or less, preferably 110° C. or less, more preferably 100° C. or less and most preferably 95° C. or less, when measured according to ASTM D3418. Preferably the melting temperature of the polymer (a) is 70° C. or more, more preferably 75° C. or more, even more preferably 78° C. or more.

Typically, the density of the polymer of ethylene (a) is higher than 855 kg/m3. Preferably the density is not higher than 970 kg/m$^3$, and preferably is from 920 to 960 kg/m$^3$, according to ISO 1183:1987.

Preferred polymer (a) is a polymer of ethylene (a1) with vinyl trimethoxysilane comonomer or a copolymer of ethylene (a2) with methylacrylate comonomer and with vinyl trimethoxysilane comonomer. The most preferred polymer (a) is a copolymer of ethylene (a2) with methylacrylate comonomer and with vinyl trimethoxysilane comonomer.

The polymer (a) of the composition can be e.g. commercially available or can be prepared according to or analogously to known polymerization processes described in the chemical literature.

In a preferable embodiment the polymer (a), i.e. polymer (a1) or (a2), is produced by polymerizing ethylene suitably with silane group(s) containing comonomer (=silane group(s) containing units present as comonomer) as defined above, and in case of polymer (a2) also with the polar comonomer(s), in a high pressure (HP) process using free radical polymerization in the presence of one or more initiator(s) and optionally using a chain transfer agent (CTA) to control the MFR of the polymer. The HP reactor can be e.g. a well-known tubular or autoclave reactor or a mixture thereof, suitably a tubular reactor. The high pressure (HP) polymerization and the adjustment of process conditions for further tailoring the other properties of the polymer, depending on the desired end application, are well known and described in the literature, and can readily be used by a skilled person. Suitable polymerization temperatures range up to 400° C., suitably from 80 to 350° C. and pressure from 70 MPa, suitably 100 to 400 MPa, suitably from 100 to 350 MPa. The high pressure polymerization is generally performed at pressures of 100 to 400 MPa and at temperatures of 80 to 350° C. Such processes are well known and well documented in the literature and will be further described later below.

The incorporation of the comonomer(s), when present, including the preferred form of silane group(s) containing units as comonomer, to the ethylene monomer and the control of the comonomer feed to obtain the desired final content of said comonomer(s) can be carried out in a well-known manner and is within the skills of a skilled person.

Further details of the production of ethylene (co)polymers by high pressure radical polymerization can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mahling pp. 7181-7184.

Such HP polymerization results in a so called low density polymer of ethylene (LDPE), herein results in polymer (a1) or polymer (a2). The term LDPE has a well-known meaning in the polymer field and describes the nature of polyethylene produced in HP, i.e. the typical features, such as different branching architecture, to distinguish the LDPE from PE produced in the presence of an olefin polymerization catalyst (also known as a coordination catalyst). Although the term LDPE is an abbreviation for low density polyethylene, the term is understood not to limit the density range, but covers the LDPE-like HP polyethylenes with low, medium and higher densities.

The polymer (a3) can be commercially available or be produced in a polymerization process using a coordination catalyst, typically Ziegler-Natta or single site catalyst, as well documented in the literature. The choice of the process, process conditions and the catalyst is within the skills of a skilled person.

Alternatively, the polymer (a3) may be prepared by known processes, in a one stage or two stage polymerization process, comprising solution polymerization, slurry polymerization, gas phase polymerization or combinations therefrom, in the presence of suitable catalysts, like vanadium oxide catalysts or single-site catalysts, e.g. metallocene or constrained geometry catalysts, known to the art skilled persons.

Preferably, the process is a one stage or two stage solution polymerization process, especially a high temperature solution polymerization process at temperatures higher than 100° C.

Such processes are essentially based on polymerizing the monomer and a suitable comonomer in a liquid hydrocarbon solvent in which the resulting polymer is soluble. The polymerization is carried out at a temperature above the melting point of the polymer, as a result of which a polymer solution is obtained. This solution is flashed in order to separate the polymer from the unreacted monomer and the solvent. The solvent is then recovered and recycled in the process.

Preferably the solution polymerization process is a high temperature solution polymerization process, using a polymerization temperature of higher than 100° C. Preferably the polymerization temperature is at least 110°, more preferably at least 150° C. The polymerization temperature can be up to 250° C.

The pressure in such a solution polymerization process is preferably in a range of 10 to 100 bar, preferably 15 to 100 bar and more preferably 20 to 100 bar.

The liquid hydrocarbon solvent used is preferably a $C_{5-12}$-hydrocarbon which may be unsubstituted or substituted by a $C_{1-4}$ alkyl group such as pentane, methyl pentane, hexane, heptane, octane, cyclohexane, methylcyclohexane and hydrogenated naphtha. More preferably unsubstituted $C_{6-10}$-hydrocarbon solvents are used.

A known solution technology suitable for the process according to the invention is the Borceed technology.

Whilst it is within the ambit of the invention for the flame retardant compositions to comprise other components, it is preferred if they consist of the ammonium polyphosphate and silane functionalised ethylene copolymer as hereinbefore defined.

Applications

The compositions of the invention have flame retardant properties and may thus be employed in a range of applications where flame retardancy is desired. In particular, the compositions of the invention may be used to coat a substrate, such as a fabric substrate.

Thus, in a further embodiment, the invention provides the use of a flame retardant composition as hereinbefore defined as a flame retardant.

The invention also relates to a substrate, preferably a fabric substrate, coated with a flame retardant composition as hereinbefore defined.

The substrate may comprise any natural and/or synthetic materials. Substrates can include fabrics, paper, aluminium foil and polymeric foil (e.g. biaxially oriented polypropylene (BOPP) or polyethylene terephthalate (PET)). Typically, the substrate is a fabric substrate. Synthetic materials include, for example, various synthetics based on polyolefins (e.g., polyethylene, polypropylene, etc.), nylon, jersey, polyester, polyurethane (e.g., a spandex material), and blends or combinations thereof. Natural materials include, for example, cotton, flex, hemp, silk, leather or blends thereof.

In one embodiment, the fabric substrate may be a non-woven material. A "non-woven" fabric is a fabric or like material that is made from fibres bonded together by chemical, mechanical, heat or solvent treatment. The term is used to denote fabrics, like felt, which are neither woven nor knitted.

In an alternative embodiment, the fabric substrate layer is a woven material. Woven fabrics include knitted fabrics, in particular polypropylene knitted fabrics.

In one embodiment, the fabric substrate comprises a material of a weight of from 100 to 500, more typically of from 150 to 400 and even more typically of from 200 to 350, grams per square meter ($g/m^2$). In one embodiment, the fabric substrate is prepared from polyester, polyethylene or polypropylene.

It is within the ambit of the invention for the substrate, such as the fabric substrates as defined above, to itself comprise a flame retardant. Such flame retardants may be any as hereinbefore defined and may be the same or different to the flame retardant(s) present in the composition of the invention. Alternatively, the flame retardant in the substrate may be any other flame retardant known in the art, or a mixture thereof.

The composition of the invention may be applied to the substrate in any suitable way known in the art, for example by extrusion, calendaring using, for example, a roller system, lamination and knife coating (after dissolution of the composition in water with additives).

One example coating method employs the calendaring coating equipment as shown in FIG. 1, consisting of two heated rollers, onto which the raw material or compounded polymer is placed, in the form of pellets. The rollers mix the polymer until a homogeneous blend is achieved, then the front roller transfers the melted coating onto the backer fabric at a set thickness (total thickness of the backer and coating together), and a surface texture is applied with a water-cooled embossing roller before the fabric is re-wound onto a roll.

Alternatively, where dry blends (the separate components—not compounded) are employed, these do not mix sufficiently to make a homogeneous coating and so these blends may be first compounded using a twin-screw extruder and, where possible, drawn through a water bath to a pelletiser to make compound pellets. These pellets can then be applied to the heated rollers for coating. More flexible blends may be too soft to cut into pellets. For these coatings, the compound can be extruded straight onto a metal spatula and then transferred to the rollers.

After application to the substrate, the composition of the invention may be further coated with one or more additional materials, such as a lacquer (e.g. a polyurethane lacquer) to increase scratch resistance and reduce transfer of the coatings to clothing, for example.

The invention also relates to an article comprising at least one component formed from a coated substrate as hereinbefore defined. Example articles include office furniture, vehicle interiors, seat cushions, back rest cushions, pillows, upholstered furniture, bed matresses, wall coverings, shoes (e.g. tongue, vamp, heel counter, quarter), sports bags, inlay of sky boots, sports equipment (e.g. boxing gloves, boxing balls), carpets, rubber boats, PVC swimming pools, life vests, handbags, purses, table coverings, table mats, stationary (e.g. books and wood inlay), saddlebags, tool bags.

It is within the ambit of the invention for the flame retardant compositions to be applied directly to substrates. Alternatively, the flame retardant compositions may be mixed with at least one polymer prior to application to said substrate.

Thus, the invention also covers a polymer composition comprising at least one polymer and the flame retardant composition of the invention. Said at least one polymer may be any suitable polymer known in the art, such as ethylene, propylene or butylene based polymers and copolymers, ethylene acrylic copolymers, ethylene acrylic ester copolymers and rubbers such as silicone rubber, nitrile butadiene rubber and butyl rubber. It is preferred if the polymer does not contain chlorine, i.e. the composition is free of chlorine containing polymers.

The flame retardant will typically be present in an amount of about 10 to 30 wt %, such as 15 to 20 wt %, relative to the total weight of the polymer composition as a whole.

The flame retardant may be added neat or as part of a polymer masterbatch. A polymer masterbatch may contain the flame retardant in a concentration of, for example, about 2.5% to about 60% by weight.

In a preferred embodiment, the at least one polymer is at least an ethylene based plastomer and a propylene based plastomer.

The term "ethylene based plastomer", as used herein, refers to a plastomer which comprises a majority amount of polymerized ethylene monomer (based on the weight of the plastomer) and, optionally, may contain at least one comonomer.

The term "propylene based plastomer", as used herein, refers to a plastomer which comprises a majority amount of polymerized propylene monomer (based on the weight of the plastomer) and, optionally, may contain at least one comonomer.

Ethylene Based Plastomer

The ethylene based plastomer has a density in the range of 0.850 to 0.915 g/cm³ and an $MFR_2$ (190° C.) in the range 0.5-30 g/10 min. It will be understood that by "ethylene-based" plastomer, we mean a plastomer in which the majority by weight derives from ethylene monomer units. Suitable ethylene-based plastomers may have an ethylene content from 60 to 95 wt %, preferably from 65 to 90 wt % and more preferably from 70 to 88 wt %. The comonomer contribution preferably is up to 40 wt %, more preferably up to 35 wt %. The comonomer contents of conventional ethylene plastomers are familiar to the person skilled in the art.

The ethylene based plastomer is preferably a copolymer of ethylene and propylene or a $C_4$-$C_{10}$ alpha-olefin. Suitable $C_4$-$C_{10}$ alpha-olefins include 1-butene, 1-hexene and 1-octene, preferably 1-butene or 1-octene and more preferably 1-octene. Ideally there is only one comonomer present. Preferably copolymers of ethylene and 1-octene are used.

The density of the ethylene-based plastomer is in the range of 0.850 to 0.915 g/cm³, preferably in the range of 0.855 to 0.910 g/cm³, such as 0.858-0.903 g/cm³.

The $MFR_2$(ISO 1133; 190° C.; 2.16 kg) of suitable ethylene based plastomers is in the range of 0.5-30 g/10 min, preferably in the range of 2.0-20 g/10 min and more preferably in the range of 5.0-15.0 g/min.

The melting points (measured with DSC according to ISO 11357-3:1999) of suitable ethylene based plastomers can be below 130° C., preferably below 120° C., more preferably below 110° C. and most preferably below 100° C. A reasonable lower limit for the melting points of suitable ethylene based plastomers may be 30° C. A typical melting point range is 33 to 115° C.

Furthermore suitable ethylene based plastomers may have a glass transition temperature Tg (measured with DMTA according to ISO 6721-7) of below −40° C., preferably below −54° C., more preferably below −58° C.

The Mw/Mn value of the ethylene based plastomer, representing the broadness of the molecular weight distribution (MWD), is preferably in the range of 1.5 to 5.0, more preferably in the range of 2.0 to 4.5, even more preferably in the range of 2.5 to 4.0.

The ethylene based plastomer can be unimodal or multimodal, preferably unimodal.

Preferably, the PE plastomer is a metallocene catalysed polymer although Ziegler-Natta based polyethylene plastomers are also possible.

In one embodiment, the ethylene based plastomer is a thermoplastic plastomer.

Whilst it is within the ambit of the invention for a single ethylene based plastomer to be used, it is also possible for a mixture of two or more ethylene based plastomers as defined herein to be employed.

Suitable ethylene based plastomers can be any copolymer of ethylene and propylene or ethylene and $C_4$-$C_{10}$ alpha olefin having the above defined properties, which are commercial available, i.a. from *Borealis* AG (AT) under the tradename Queo, from DOW Chemical Corp (USA) under the tradename Engage or Affinity, or from Mitsui under the tradename Tafmer.

Alternatively, the ethylene based plastomer can be prepared by known processes, in a one stage or two stage polymerization process, comprising solution polymerization, slurry polymerization, gas phase polymerization or combinations therefrom, in the presence of suitable catalysts, like vanadium oxide catalysts or single-site catalysts, e.g. metallocene or constrained geometry catalysts, known to the art skilled persons.

Preferably these ethylene based plastomers are prepared by a one stage or two stage solution polymerization process, especially by high temperature solution polymerization process at temperatures higher than 100° C.

Such processes are essentially based on polymerizing the monomer and a suitable comonomer in a liquid hydrocarbon solvent in which the resulting polymer is soluble. The polymerization is carried out at a temperature above the melting point of the polymer, as a result of which a polymer solution is obtained. This solution is flashed in order to separate the polymer from the unreacted monomer and the solvent. The solvent is then recovered and recycled in the process.

Preferably the solution polymerization process is a high temperature solution polymerization process, using a polymerization temperature of higher than 100° C. Preferably the polymerization temperature is at least 110°, more preferably at least 150° C. The polymerization temperature can be up to 250° C.

The pressure in such a solution polymerization process is preferably in a range of 10 to 100 bar, preferably 15 to 100 bar and more preferably 20 to 100 bar.

The liquid hydrocarbon solvent used is preferably a C5-12-hydrocarbon which may be unsubstituted or substituted by a C1-4 alkyl group such as pentane, methyl pentane, hexane, heptane, octane, cyclohexane, methylcyclohexane and hydrogenated naphtha. More preferably unsubstituted $C_{6-10}$-hydrocarbon solvents are used.

A known solution technology suitable for the process according to the invention is the Borceed technology.

It will be appreciated that the ethylene based plastomer may contain standard polymer additives.

The ethylene based plastomer may be present in the range 20 to 90 wt %, however typically it forms 30 to 90 wt % of the polymer composition, wherein said wt % values are relative to the total weight of the composition as a whole. In a preferable embodiment, the ethylene based plastomer forms 35 to 75 wt %, such as 40 to 65 wt % (relative to the total weight of the composition as a whole) of the polymer composition.

Propylene Based Plastomer

The propylene based plastomer has a density in the range of 0.860 to 0.910 g/cm³ and an $MFR_2$ (230° C.) in the range 0.01-30 g/10 min. It is within the ambit of the invention for the composition to comprise only a single propylene based plastomer as defined herein. Alternatively, a mixture of at least two such propylene based plastomers may be employed. Additional propylene based plastomers with properties differing from those herein defined for "the propylene based plastomer" may also be employed in the compositions of the invention.

The propylene based plastomer is typically a copolymer of propylene and ethylene or a C4-C10 alpha-olefin, such as a copolymer of propylene with ethylene, butene, hexene or octene. It will be understood that propylene forms the major component in the propylene based plastomer. Propylene will typically be present in an amount of 55 to 95 wt % If the comonomer is ethylene, the content of ethylene is preferably 5 to 30 wt %, such as 7.5 to 20 wt % in the propylene ethylene copolymer.

In all circumstances the propylene based plastomer has a density in the range of 0.860 to 0.910 g/cm³. In a preferable embodiment, the density of the propylene based plastomer is 0.863 to 0.905 g/cm³, such as 0.870 to 0.900 g/cm³.

The propylene based plastomer preferably has a molecular weight distribution(MWD), defined as weight average molecular weight divided by number average molecular weight (Mw/Mn) of 3.5 or less; or 3.0 or less; or from 1.8 to 3.0.

The weight average molecular weight (Mw) of the propylene based plastomers of this invention can vary widely, but typically it is between about 10,000 and 1,000,000 (with the understanding that the only limit on the minimum or the maximum Mw is that set by practical considerations).

The propylene based plastomer can be made by any process, and includes copolymers made by Ziegler-Natta, CGC (Constrained Geometry Catalyst), metallocene, and nonmetallocene, metal-centered, heteroaryl ligand catalysis. Propylene based plastomers of the invention are ideally formed using metallocene type catalysts.

The propylene based plastomer, in certain embodiments, is characterized as having substantially isotactic propylene sequences. "Substantially isotactic propylene sequences" means that the sequences have an isotactic triad (mm) measured by $^{13}$C NMR of greater than 0.85; in the alternative, greater than 0.90; in another alternative, greater than 0.92; and in another alternative, greater than 0.93. Isotactic triads are well-known in the art and are described in, for example, U.S. Pat. No. 5,504,172 and International Publication No. WO 00/01745, which refers to the isotactic sequence in terms of a triad unit in the copolymer molecular chain determined by $^{13}$C NMR spectra.

These copolymers include random, block and graft copolymers although preferably the copolymers are of a random configuration. In one embodiment, the propylene based plastomer is preferably one which contains a random distribution of ethylene within the otherwise isotactic propylene chains. In can therefore be considered a random propylene ethylene copolymer. It is not however a heterophasic copolymer.

Propylene based plastomers for use in the invention are commercially available and can be bought from polymer suppliers. Examples include those available from The Dow Chemical Company, under the trade name VERSIFY, or from ExxonMobil Chemical Company, under the trade name VISTAMAXX.

The propylene based plastomer typically forms 5 to 45 wt % of the polymer composition, wherein said wt % values are relative to the total weight of the composition as a whole. In a preferable embodiment, the propylene based plastomer forms 8 to 40 wt %, such as 10 to 35 wt % (relative to the total weight of the composition as a whole) of the polymer composition.

It will be understood that, in addition to the ethylene-based plastomer and the propylene based plastomer, the polymer composition may comprise further polymeric components. These may be added to enhance the properties of the composition.

Examples of additional polymers include ethylene, propylene or butylene based polymers and copolymers, ethylene acrylic copolymers, ethylene acrylic ester copolymers and rubbers such as silicone rubber, nitrile butadiene rubber and butyl rubber. It is preferred if any additional polymers do not contain chlorine, i.e. the composition is free of chlorine containing polymers.

Typically, additional polymeric components are added in amount of 0.5 to 10 wt %, such as 1 to 5 wt %, e.g. 3 wt % relative to the total weight of the polymer composition as a whole.

"Polymeric component(s)" exclude herein any carrier polymer(s) of the flame retardant and/or optional additive(s), e.g. carrier polymer(s) used in master batch(es) of the flame retardant or additive(s) optionally present in the composition.

In one preferable embodiment, in addition to the ethylene-based plastomer and the propylene based plastomer as hereinbefore defined, the polymer composition further comprises a high melt flow rate propylene based plastomer. By "high melt flow rate" we typically mean an $MFR_2$ (230° C.) of greater than 5000 g/cm³, such as greater than 7000 g/cm³.

The high melt flow rate propylene based plastomer is typically a copolymer of propylene and ethylene or a C4-C10 alpha-olefin, most preferably a copolymer of propylene with ethylene. It will be understood that propylene forms the major component in the high melt flow rate propylene based plastomer. Propylene will typically be present in an amount of 55 to 95 wt % where ethylene is the comonomer, the content of ethylene is preferably 5 to 30 wt %, such as 7.5 to 20 Wt %.

In all circumstances the high melt flow rate propylene based plastomer preferably has a density in the range of 0.860 to 0.910 g/cm³. In a preferable embodiment, the density of the high melt flow rate propylene based plastomer is 0.865 to 0.905 g/cm³, such as 0.870 to 0.900 g/cm³.

The high melt flow rate plastomer is preferably one which contains random distribution of ethylene with the otherwise isotactic propylene chains. It can therefore be considered a random propylene ethylene copolymer. Example commercially available high melt flow rate propylene based plastomers include Vistamaxx 8880 of ExxonMobil.

Without wishing to be bound by theory, the high melt flow rate propylene based plastomer is thought to act as a compatibiliser, helping to generate a more homogenous composition.

In another embodiment, the polymer composition further comprises a copolymer of propylene which is different to the propylene based plastomer and the high melt strength propylene based plastomer as hereinbefore defined. Such a copolymer may be a copolymer of propylene and ethylene or a $C_4$-$C_{10}$ alpha-olefin.

The polymer composition may further comprise a propylene copolymer which is heterophasic propylene copolymer comprising a matrix (M) being a random propylene copolymer (R-PP) and an elastomeric propylene copolymer (E) dispersed in said matrix (M).

The heterophasic propylene copolymer typically comprises 60.0 to 85.0 wt.-%, based on the total weight of the heterophasic propylene copolymer, of the random propylene copolymer (R-PP) and 15.0 to 40.0 wt.-%, based on the total weight of the heterophasic propylene copolymer, of the elastomeric propylene copolymer (E). The comonomers of the random propylene copolymer (R-PP) and/or the comonomers of the elastomeric propylene copolymer (E) may be ethylene and/or C4 to C8 α-olefins. Suitable commercially available heterophasic propylene copolymers comprising a propylene random copolymer as matrix phase include Bormed™ SC876CF available from Borealis Polyolefine GmbH (Austria).

It will be appreciated that one or more additives known in the art of polymer processing can also be included in the polymer composition. Suitable additives include fillers; lubricants; processing aids; antioxidants, for example, phenolic antioxidants such as Lowinox TBM-6 marketed by Addivant and IRGANOX 1010 which is pentaerythritol tetrakis (3-(3, 5-di-tert-butyl-4hydroxyphenyl) propionate or IRGANOX 1035 which is octadecyl-3-(3, 5-di-tert-butyl-4-hydroxyphenyl)-propionate marketed by BASF or aminic antioxidants such as Vulcanox HS and Flectol H which are polymerized 2,2,4trimethyl-1, 2-dihydroquinoline; metal deactivators and/or copper inhibitors, for example, hydrazides such as oxalic acid benzoyl hydrazide (OABH) or Irganox 1024 which is 2,3-bis-((3-(3,5-di-tert-butyl-4-hydroxyphenyl) propionyl)) propiono hydrazide; UV absorbers, for example Tinuvin or HALS type UV absorbers; light stabilisiers; nucleating agents; foaming or blowing agents which may be either endothermic or exothermic for example, p. p-oxybis benzene-sulfonyl-hydrazide, azo-isobutyro-nitrile and azodicarbonamide; processing and/or thermal stabilisers, for example tris (2,4-ditertbutylphenyl) phosphite (phosphite based), pentaerythritol tetrakis (3-(3, 5-di-tertbutyl-4-hydroxyphenyl) propionate), octadecyl-3 (3,5-di-tert-butyl-4-hydroxyphenyl) propionate, 3,3', 3', 5,5', 5'-hexa-tert-butyl-a, a', a'-(mesitylene-2,4,6triyl) tri-p-cresol (phenolic based) and dioctadecyl-3,3' thiodipropionate (thioester based); and pigments, for example, inorganic pigments such as titanium dioxide and carbon black and organic pigments.

The additives may be present in amounts in the range of 0.1 to 10 wt %, preferably 0.5 to 10 wt %, relative to the total weight of the composition as a whole.

In all embodiments, it is preferred if the composition is halogen free, i.e. it does not contain any component which comprise halogens, especially chlorine.

The polymer composition may be prepared by any suitable method. Ideally, a method is used which produces a homogenous mixture of the various components. Typically, compounding is employed. Compounding usually involves mixing or/and blending the various components in a molten state, often by extrusion. Such methods will be well known to the person skilled in the art.

The invention will now be described with reference to the following non limiting figures and examples.

Test Methods:

Density

Density of the materials is measured according to ISO 1183-1:2012, with isopropanol-water as gradient liquid. The cooling rate of the plaques when crystallising the samples was 15° C./min. Conditioning time was 16 hours.

Melt Flow Rate (MFR) or Melt Index (MI)

The melt flow rate (MFR) is determined according to ISO 1133 and is indicated in g/10 min. The MFR is an indication of the melt viscosity of the polymer. The MFR is determined at 190° C. for PE and at 230° C. for PP. The load under which the melt flow rate is determined is usually indicated as a subscript, for instance $MFR_2$ is measured under 2.16 kg load, $MFR_5$ is measured under 5 kg load or $MFR_{21}$ is measured under 21.6 kg load.

Molecular Weights, Molecular Weight Distribution, Mn, Mw, MWD

The weight average molecular weight Mw and the molecular weight distribution (MWD=Mw/Mn wherein Mn is the number average molecular weight and Mw is the weight average molecular weight) is measured by a method based on ISO 16014-4:2003.

Comonomer Content

Comonomer Content (% wt and % mol) was determined by using $^{13}$C-NMR. The $^{13}$C-NMR spectra were recorded on Bruker 400 MHz spectrometer at 130° C. from samples dissolved in 1,2,4-trichlorobenzene/benzene-$d_6$ (90/10 w/w). Conversion between % wt and % mol can be carried out by calculation.

Cigarette Test

An assessment of ignitability was carried out in accordance with the BS EN 1021-1:2006 smoldering cigarette test Flame Retardancy Flame retardant behaviour was assessed using an FTT Dual Cone Calorimeter R1771 according to ISO 5660:2015.

Experimental

Materials

Propylene based plastomer (PP plast): a random propylene ethylene metallocene plastomer, density=0.862 g/cm³, $MFR_2$ (230° C., 2.16 kg)=20 g/10 min Ethylene based plastomer (1) (PE plast 1): an ethylene octene metallocene plastomer, density=0.870 g/cm³, $MFR_2$ (190° C./2.16 kg)=6.6 g/10 min Ethylene based plastomer (2) (PE plast 2): an ethylene octene metallocene plastomer, density=0.902 g/cm³, $MFR_2$ (190° C./2.16 kg)=10 g/10 min Ethylene based plastomer (3) (PE plast 3): an ethylene octene metallocene plastomer, density=0.902 g/cm³, $MFR_2$ (190° C./2.16 kg)=3 g/10 min High MFR PP plastomer (1): a random propylene ethylene metallocene plastomer, density=0.879 g/cm³, $MFR_2$ (230° C., 2.16 kg)=7715 g/10 min Polypropylene copolymer (PP copo): a propylene ethylene random heterophasic copolymer, density=890 g/cm³, $MFR_2$ (230° C., 2.16 kg)=3.8 g/10 min Flame retardant 1 (FR1): ammonium polyphosphate (commercially available ADKSTAB FP2500S)

Flame retardant 2 (FR2): copolymer of ethylene, methyl acrylate and vinyl trimethoxy silane (VTMS), density=0.946 g/cm³, $MFR_2$ (190° C./2.16 kg)=3 g/10 min Flame retardant 3 (FR3): ammonium polyphosphate (commercially available IC FR5110)

Preparation of Compostions:

Sixteen inventive compositions were prepared by gravitmetric feeding of various components to a twin screw extruder.

TABLE 1

Production Data for Inventive Compositions (amounts are given in parts by weight)

| | PP Plast | PE Plast 1 | PE Plast 2 | PE Plast 3 | High MFR PP plast | PP copo | FR1 | FR2 | FR3 | Proc. Additive | Emulsifier (GMS) | UV additive | Anti-static additive | Pigment |
|---|---|---|---|---|---|---|---|---|---|---|---|---|---|---|
| IE1 | 30 | 43 | — | — | 3 | | — | 10 | 12 | 8 | 3 | 2 | — | 3 |
| IE2 | 30 | 43 | — | — | 3 | | — | 10 | 12 | 6 | 3 | 2 | 3 | 3 |
| IE3 | 30 | 43 | — | — | 3 | | — | 10 | 12 | 6 | 3 | 2 | 4 | 3 |
| IE4 | 30 | 43 | — | — | 3 | | — | 10 | 12 | 6 | 3 | 2 | 6 | 3 |
| IE5 | 30 | 43 | — | — | 3 | | — | 10 | 12 | 6 | 3 | 2 | 10 | 3 |
| IE6 | 30 | 43 | — | 6 | 1 | | — | 10 | 12 | 8 | 3 | 2 | — | 3 |
| IE7 | 30 | 43 | — | — | 1 | | — | 10 | 6 | 8 | 3 | 2 | 3 | 3 |
| IE8 | 30 | 43 | — | — | 1 | | — | 10 | — | 8 | 3 | 2 | 3 | 3 |
| IE9 | 30 | 43 | — | — | 1 | | — | 10 | 12 | 8 | 3 | 2 | 3 | 3 |
| IE10 | 30 | 43 | — | — | 1 | | — | 10 | 18 | 8 | 3 | 2 | 3 | 3 |
| IE11 | 30 | 43 | — | — | 1 | | — | 15 | 24 | 8 | 3 | 2 | 3 | 3 |
| IE12 | 30 | 43 | — | — | 1 | | — | 10 | 12 | 8 | 3 | 2 | 3 | 3 |
| IE13 | 30 | 43 | — | — | 1 | | — | 10 | 12 | — | 3 | 2 | — | 3 |
| IE14 | 31 | 41 | — | — | 1 | 10.3 | — | 5.2 | 6.2 | — | — | 2.1 | — | 3.1 |
| IE15 | 28.9 | 38.9 | — | — | 1 | 9.7 | — | 4.9 | 11.7 | — | — | 2 | — | 2.9 |
| IE16 | 26.9 | 35.9 | — | — | 0.9 | 9 | — | 6.7 | 16.1 | — | — | 1.8 | — | 2.7 |

Production of Coated Substrates & Cigarette Test Results:

Five additional inventive compositions (IE17 to IE21) were prepared in the same manner as for IE1 to IE16 and were coated onto fabric substrates using the following methods. Lab-scale calendaring coating equipment (FIG. 1) was employed, consisting of two heated rollers, onto which the raw material or compounded polymer was placed, in the form of pellets. The rollers mix the polymer until a homogeneous blend is achieved, then the front roller transfers the melted coating onto the backer fabric at a set thickness (total thickness of the backer and coating together), and a surface texture is applied with a water-cooled embossing roller before the fabric is re-wound onto a roll. Dry blends (the separate components—not compounded) do not mix sufficiently to make a homogeneous coating. Therefore, these blends were first compounded using a twin-screw extruder and, where possible, drawn through a water bath to a pelletiser to make compound pellets. These pellets were then applied to the heated rollers for coating. The more flexible blends were too soft to cut into pellets. For these coatings, the compound was extruded straight onto a metal spatula and then transferred to the rollers.

A polyurethane lacquer was further added and the materials subjected to the Cigarette test. The formulations used and the results of the tests are shown in Table 2. Table 3 shows flame retardancy data for selected compositions.

TABLE 2

Coated substrate formulations & Cigarette test results (figures represent parts by weight)

| | Substrate | PE Plastomer 1 | Pigment | PP Plastomer | High MFR PP plastomer | Flame retardant 1 | Flame retardant 2 | UV additive | Lacquer | Cig. test |
|---|---|---|---|---|---|---|---|---|---|---|
| IE17 | PP jersey | 43 | 3 White | 30 | 3 | 12 | 10 | 2 | PU | Pass |
| IE18 | PP jersey | 43 | 3 Orange | 30 | 3 | 12 | 10 | 2 | PU | Pass |
| IE19 | PP-FR* | 43 | 3 Blue | 30 | 3 | 2 | 10 | 2 | PU | Pass |
| IE20 | PP jersey | 43 | 3 Blue | 30 | 3 | 18 | 10 | 2 | PU | Pass |
| IE21 | PP-FR* | 43 | 3 Blue | 30 | 3 | 18 | 10 | 2 | PU | Pass |

*Polypropylene substrate comprising flame retardant

TABLE 3

| Flame Retardancy results (test carried out on composition only, no fabric) | | | |
| --- | --- | --- | --- |
| | | IE18 | IE20 |
| burning time | s | 138 | 177.5 |
| burning time #1 | s | 230 | 305 |
| burning time SD | s | 130.1 | 180.3 |
| comment | | | Char formation |
| heat release rate | kW/m2 | 97.56 | 92.6 |
| heat release rate #1 | kW/m2 | 97.56 | 92.6 |
| heat release rate SD | kW/m2 | 0 | 0 |
| ignition time | s | 138 | 177.5 |
| Ignition time #1 | s | 46 | 50 |
| Ignition time #2 | s | | |
| ignition time SD | s | 130.1 | 180.3 |
| Oxygen content | % | 19 | 21 |

The invention claimed is:

1. A flame retardant composition comprising:

a) an ammonium polyphosphate represented by the formula $[NH_4PO_3]_n$, wherein n is greater than 1000; and b) a silane functionalised ethylene copolymer, which is a copolymer of ethylene and a silane containing comonomer and optionally one or more further comonomers;

wherein the melt flow rate, $MFR_2$, of the silane functionalized ethylene copolymer is 0.1 to 10 g/10 min; and wherein a weight ratio of the ammonium polyphosphate to the silane functionalized ethylene copolymer is in the range 9:1 to 3:1.

2. The flame retardant composition according to claim 1, wherein the silane functionalized ethylene copolymer is a polymer of ethylene (a) selected from:

(a1) a copolymer of ethylene and a silane group(s) containing comonomer; or (a2) a copolymer of ethylene with one or more polar comonomer(s) selected from (C1-C6)-alkyl acrylate or (C1-C6)-alkyl (C1-C6)-alkylacrylate comonomer(s), and silane group(s) containing monomer, wherein copolymer (a2) is different from the polymer of ethylene (a1).

3. The flame retardant composition according to claim 1, wherein the silane functionalized ethylene copolymer is a terpolymer.

4. The flame retardant composition according to claim 1, wherein the silane functionalized ethylene copolymer comprises a silane group(s) containing comonomer of Formula (I):

$$R^1SiR^2_qY_{3-q} \tag{I}$$

wherein $R^1$ is an ethylenically unsaturated hydrocarbyl, hydrocarbyloxy or (meth)acryloxy hydrocarbyl group, each $R^2$ is independently an aliphatic saturated hydrocarbyl group, Y is the same or different, and is a hydrolysable organic group and wherein q is 0, 1 or 2.

5. The flame retardant composition according to claim 1, wherein said silane functionalized ethylene copolymer is a copolymer of ethylene with a methyl acrylate comonomer and a vinyl trimethoxysilane comonomer.

6. A polymer composition comprising at least one polymer and the flame retardant composition of claim 1.

7. A process for coating a substrate with the flame retardant composition of claim 1, said process comprising applying said composition to the surface of said substrate.

8. A substrate comprising a fabric substrate, coated with the flame retardant composition of claim 1.

9. The substrate as claimed in claim 8, wherein the fabric substrate is a woven or non-woven fabric.

10. An article comprising at least one component formed from the coated substrate as defined in claim 8.

11. The article as claimed in claim 10, wherein the article is selected from the group consisting of office furniture, vehicle interiors, seat cushions, back rest cushions, pillows, upholstered furniture, bed mattresses, wall coverings, shoes, sports bags, inlay of sky boots, sports equipment, carpets, rubber boats, PVC swimming pools, life vests, handbags, purses, table coverings, table mats, stationary, saddlebags, tool bags.

12. The substrate as claimed in claim 9, wherein the fabric substrate is a knitted fabric.

13. The article as claimed in claim 11, wherein the shoes comprise tongue, vamp, heel counter, quarter, or a combination thereof.

14. The article as claimed in claim 11, wherein the sports equipment comprises boxing gloves, boxing balls, or a combination thereof.

15. The article as claimed in claim 11, wherein the stationary comprises books, wood inlay, or any combination thereof.

16. A flame retardant composition consisting of:

a) an ammonium polyphosphate; and b) a silane functionalized ethylene copolymer;

wherein the melt flow rate, $MFR_2$, of the silane functionalized ethylene copolymer is 0.1 to 10 g/10 min; and wherein a weight ratio of the ammonium polyphosphate to the silane functionalized ethylene copolymer is in the range 9:1 to 3:1.

17. The flame retardant composition according to claim 1, wherein the ammonium polyphosphate has a solubility in water of less than 0.1 g/100 ml.

* * * * *